Nov. 12, 1963 C. RINER 3,110,507
TRAILER BRAKE CONTROL UNIT
Filed Aug. 15, 1962 2 Sheets-Sheet 1
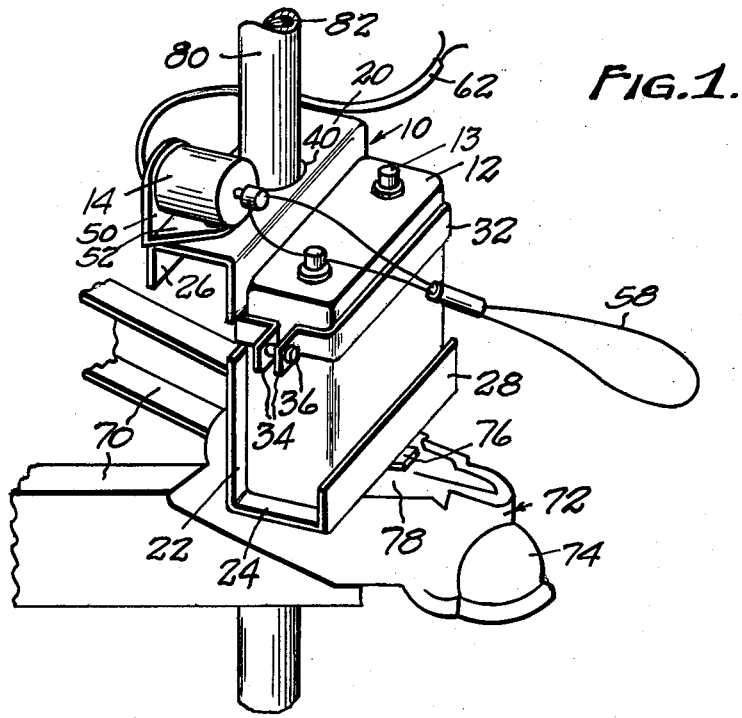
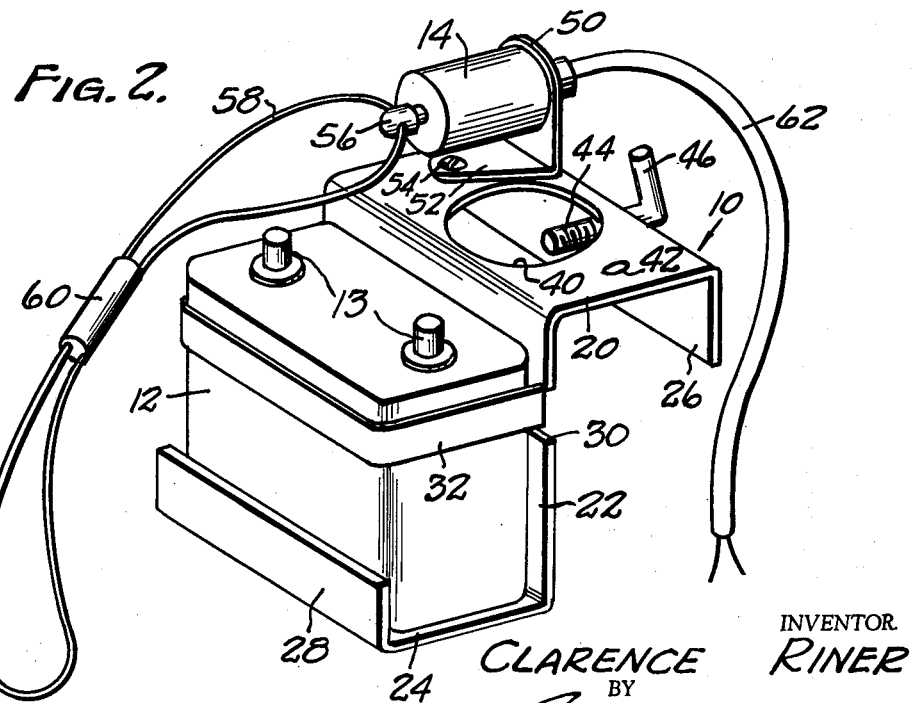
INVENTOR.
CLARENCE RINER
BY
Eugene C. Knoblock
ATTORNEY.

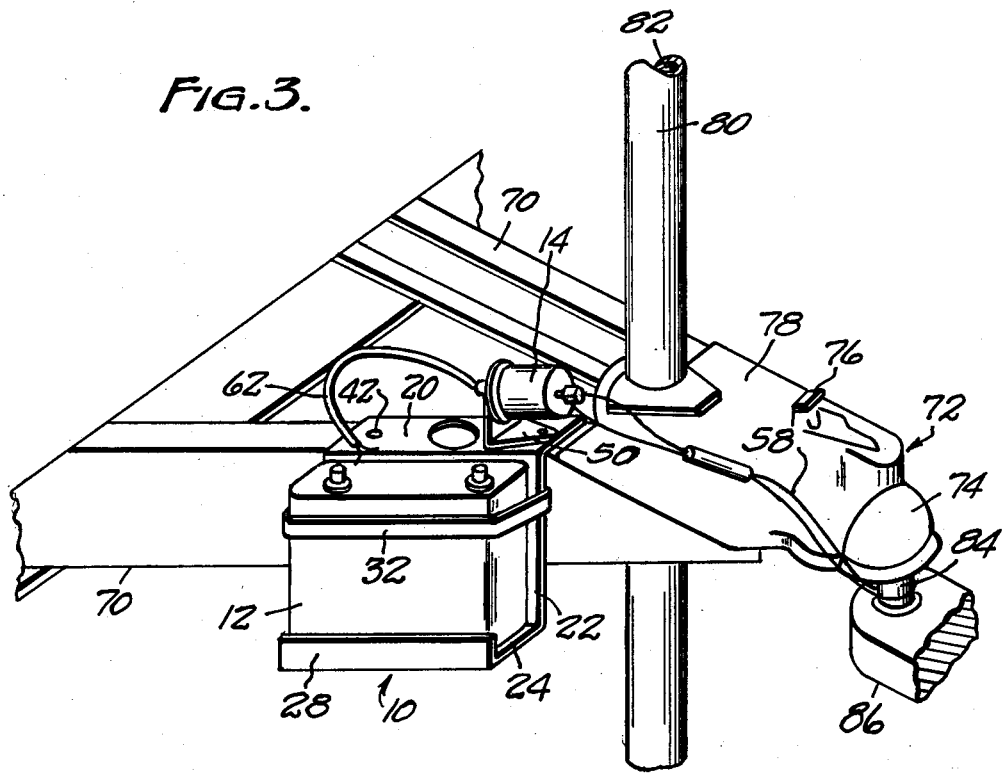

3,110,507
TRAILER BRAKE CONTROL UNIT
Clarence Riner, 3413 Kent Lane, South Bend, Ind.
Filed Aug. 15, 1962, Ser. No. 216,934
5 Claims. (Cl. 280—422)

This invention relates to improvements in trailer brake actuating units, and more particularly to a unit for actuating the brakes of a trailer under emergency conditions in the event of break-away of the trailer from the tractive vehicle.

It is required under the laws of some states that trailers, such as mobile homes, which are detachably connected to a tractive vehicle be equipped with brakes which can be energized by the driver of the tractive or towing vehicle. A further requirement is that the brakes of the trailer be provided with means for automatically setting or actuating them if the connection between the towing vehicle and the trailer is broken.

Trailer brakes are customarily operated electrically and can be connected with an electrical circuit of a towing vehicle by a separable electrical connector so as to make possible energization of the brakes of the trailer by the driver of the towing vehicle. The requirement that the trailer brakes be energized automatically if the trailer breaks away from the towing vehicle necessitates mounting upon the trailer of a battery to supply power for emergency application of the brakes and the mounting of a switch to close the circuit to the trailer-mounted battery in the event the towing connection between the trailer and the tractive vehicle is broken.

It is the primary object of this invention to provide a novel, simple, inexpensive, convenient and universally applicable mounting for a battery and a break-away switch to a trailer in any of a number of different operative positions and arrangements and adapted for convenient connection to a towing vehicle.

A further object is to provide a unit consisting of a carrier mounting a battery and a switch and provided with means for detachably connecting the same in any of a number of different positions upon a trailer adjacent a trailer hitch with means for connecting the switch detachably to a part of the towing vehicle in a manner to trip the switch if the trailer breaks away from the towing vehicle.

Other objects will be apparent from the following specification.

In the drawing:

FIG. 1 is a perspective illustrating an attachment mounted in one position upon a tongue of a trailer adjacent a hitch thereof;

FIG. 2 is a perspective view of the attachment unit;

FIG. 3 is a perspective view illustrating an attachment unit mounted upon a trailer in a position different than FIG. 1, and illustrating the connection of a switch thereof to a part of the tractive vehicle.

Referring to the drawings which illustrate one embodiment of the invention, and particularly to FIG. 2 which illustrates an attachment assembly, the numeral 10 designates a carrier which supports a battery 12 and a switch 14.

The carrier 10 is preferably formed of sheet metal bent into substantially S-shape characterized by a top wall 20, a vertical wall 22, and a bottom wall 24. A flange 26 depends from the top wall 20 spaced from and substantially parallel to the vertical wall 22 and an upwardly projecting flange 28 is carried by the free margin of the bottom wall 24 spaced from and substantially parallel to the vertical wall 22. The spacing of the flange 28 from the wall 22 is preferably equal to the thickness of battery 12 which rests upon the bottom wall. The vertical wall 22 is preferably provided with a pair of opposed notches 30 at its opposite vertical margins spaced above the level of the flange 28 and these notches cooperate to receive a metal strap clamp 32 which passes around the battery 12 and has outturned ends or ears 34 interconnected by a drawbolt 36 or other securing means which can be utilized to draw together the clamp ears 34 and thereby firmly anchor the battery 12 to the carrier in contact with the vertical wall 22 while it is supported upon the bottom wall 24. The battery will have the usual terminals 13 positioned at the top thereof.

The top wall 20 of the carrier has a large central opening 40 therein, preferably terminating slightly spaced from the vertical wall 22 and the depending flange 26. Also, one or more small openings 42 are formed in the top wall 20, preferably adjacent opposite ends thereof as shown. The depending flange 26 has a screw-threaded opening therein spaced below the top wall 20 and preferably centered relative to the opening 40, within which is screw-threaded a clamping screw 44. The screw 44 is preferably provided with a hand grip 46 so that it may be manipulated by hand and without the assistance of tools.

Switch 14 is mounted upon a bracket 50 which is preferably L-shaped and is provided with a base portion 52 bearing upon the top wall 20 and rotatably connected thereto detachably by securing means 54 such as a nut and bolt. The switch 14 is supported upon the vertical leg of the bracket 50 in any suitable manner, preferably spaced above the bracket base 52. The switch is preferably of the normally open or inoperative type and, in the form shown, is characterized by a pull plug 56 whose operative position within the switch insures the open circuit conditioning of the switch. The pull plug is connected with an elongated cable loop 58 which preferably has a center tie member 60. The arrangement is such that a pull upon the cable loop 58 will withdraw the plug 56 from the switch 14, whereupon the switch will automatically assume a circuit closing position. A two-wire insulated lead 62 is connected with switch 14.

FIG. 1 illustrates one manner in which the attachment may be mounted upon a trailer for connection with a towing vehicle. Trailers such as mobile homes are usually provided with forwardly projecting tongue portions which frequently include forwardly converging beams or other structural members 70, which are interconnected at their forward ends and mount a hitch member 72 at their front ends, which member usually includes an inverted cup-shaped portion 74 with which is associated a releasable latch having an actuator part 76. The hitch 72 may include a plate portion 78 which carries, in rearwardly spaced relation to the hitch, the outer tube part of a jack assembly of the character having a jack shaft 82 screw-threaded therein. The jack shaft is normally adjusted to an elevated position while the vehicle is running and is lowered to support the front of the trailer when disconnected from a tractive vehicle.

The attachment assembly illustrated in FIG. 2 is easily applied to the trailer in the arrangement illustrated in FIG. 1 by lowering the attachment relative to the jack tube 82 in such a manner as to permit the aperture 40 of the carrier to encircle the tube 80 until the carrier comes to rest upon a support, such as plate portion 78, or one or both of tongue members 70. The attachment can be positioned in any angular or rotative orientation desired and convenient, and can be locked in that position by tightening the clamping screw 44. The opening 40 will preferably be of a diameter slightly greater than the diameter of the tube 80 so as to accommodate a free and loose fit thereof without detracting from ready clamping of the attachment by advance of the clamp screw 44 to press against the tube 80 at one side thereof in a manner to cause it to firmly grip the opening 40 at the diametrically opposite side thereof. The pivotal mounting of the switch bracket 50 permits the switch to be oriented as desired and, for this purpose, the switch can be mounted at any selected one of the various openings 42 in the top wall 20 thereof. Assembly of the unit is completed by passing the cable loop 58 around some part of the tractive vehicle (not shown in FIG. 1) in such a manner that if disconnection of the hitch occurs, such as to separate the tractive and trailing vehicles, a pull will occur upon the cable to release the plug 56 from the switch and thereby activate the switch.

FIG. 3 illustrates another arrangement wherein the top wall 20 of the clamp bears against one of the tongue members 70 and is anchored thereat by the clamp screw 44 to position the assembly firmly. It will be noted that in this arrangement the switch-mounting clamp has been rotated from the position shown in FIGS. 1 and 2 for convenience. Also, it will be observed that, in this figure, is illustrated the positioning of the cable loop 58 to extend around the shank 84 of a hitch ball mounted on a suitable support 86 on the tractive vehicle.

In neither FIG. 1 nor FIG. 3 is the electrical connection of the battery and the switch to the wheel brakes shown. It will be understood that this arrangement is conventional, however, and that suitable electrical conductors will connect the brakes, the battery and the switch to define a brake-operating circuit which is normally open at the switch 14 and which is powered by the battery 12 so that the action of pulling the plug 56 from the switch 14 will close the circuit and cause current to flow to the brakes from the battery 12 to energize the brakes.

While the preferred embodiment of the invention has been illustrated and described, it will be understood that changes in the construction may be made within the scope of the appended claims without departing from the spirit of the invention.

I claim:

1. A trailer brake actuating unit adapted to be mounted on the tongue of a towed vehicle for connection with a towing vehicle comprising,
    a carrier of substantially S-shape having top, bottom and substantially vertical walls,
    a battery mounted on said bottom wall,
    a band clamp releasably anchoring said battery to said vertical wall spaced above said bottom wall,
    said top wall having a central aperture and a pivot aperture,
    a bracket pivoted on said top wall at said pivot aperture,
    a flange projecting downwardly from said top wall,
    a clamp screw having screw-threaded connection with said flange adjacent said central aperture for securing said flange to said towed vehicle,
    a switch carried by said bracket, and
    a flexible switch actuator carried by said switch for connection with said towing vehicle.

2. A trailer brake actuating unit adapted to be mounted on the tongue of a towed vehicle for connection with a towing vehicle, comprising
    a carrier of substantially S-shape having top, bottom and substantially vertical walls,
    a battery mounted on said bottom wall,
    a band clamp releasably anchoring said battery to said vertical wall spaced above said bottom wall,
    said top wall having a central aperture and a pivot aperture,
    a bracket pivoted on said top wall at said pivot aperture,
    a flange projecting downwardly from said top wall,
    a clamp screw having screw-threaded connection with said flange adjacent said central aperture for securing said flange to said towed vehicle,
    a switch carried by said bracket, and
    a flexible switch actuator carried by said switch for connection with said towing vehicle,
    said vertical carrier wall having a notch in at least one margin thereof,
    said band clamp seating in said notch.

3. A trailer brake actuating unit adapted to be mounted on the tongue of a towed vehicle for connection with a towing vehicle, comprising
    a carrier of substantially S-shape having top, bottom and substantially vertical walls,
    a battery mounted on said bottom wall,
    a band clamp releasably anchoring said battery to said vertical wall spaced above said bottom wall,
    said top wall having a central aperture and a pivot aperture,
    a bracket pivoted on said top wall at said pivot aperture,
    a flange projecting downwardly from said top wall,
    a clamp screw having screw-threaded connection with said flange adjacent said central aperture for securing said flange to said towed vehicle,
    a switch carried by said bracket, and
    a flexible switch actuator carried by said switch for connection with said towing vehicle,
    said bottom wall having an upturned battery-retaining flange at its margin.

4. A trailer brake-actuating unit adapted to be mounted on the tongue of a towed vehicle for connection with a towing vehicle, comprising
    a substantially rigid carrier having a substantially vertical part,
    a battery supported by said carrier,
    a clamp band detachably anchoring said battery to said vertical carrier part,
    said carrier having a rigid clamp portion projecting laterally from the upper part of said vertical wall for connection to said towed vehicle,
    a switch bracket pivoted to said rigid clamp portion,
    a switch mounted on said bracket, and
    a flexible switch actuator carried by said switch for connection with said towing vehicle.

5. A trailer brake-actuating unit adapted to be mounted on the tongue of a towed vehicle for connection with a towing vehicle, comprising
    a substantially rigid carrier having a substantially vertical part,
    a battery supported by said carrier,
    a clamp band detachably anchoring said battery to said vertical carrier part,
    said carrier having a rigid clamp portion projecting laterally from the upper part of said vertical wall for connection to said towed vehicle,
    a switch bracket pivoted to said rigid clamp portion,
    a switch mounted on said bracket, and
    a flexible switch actuator carried by said switch for connection with said towing vehicle,
    said rigid clamp portion including
    a top wall having a central aperture,
    a rigid flange depending from said top wall, and
    a clamping screw having a screw-threaded connection with said flange adjacent said central aperture.

References Cited in the file of this patent

UNITED STATES PATENTS

| | | |
|---|---|---|
| 1,564,989 | Weisberger | Dec. 8, 1925 |
| 1,734,645 | Polland | Nov. 5, 1929 |
| 1,862,714 | Snow | June 14, 1932 |
| 2,226,251 | Mayer | Dec. 24, 1940 |
| 2,480,202 | Stassen | Aug. 30, 1949 |
| 2,660,715 | Glass et al. | Nov. 24, 1953 |
| 2,676,225 | Jubell | Apr. 20, 1954 |
| 2,786,690 | Tharp | Mar. 26, 1957 |
| 3,062,326 | Jones et al. | Nov. 6, 1962 |